US012612943B2

(12) United States Patent (10) Patent No.: US 12,612,943 B2
Yamaguchi (45) Date of Patent: Apr. 28, 2026

(54) LINEAR MOTION GUIDE UNIT

(71) Applicant: NIPPON THOMPSON CO., LTD., Tokyo (JP)

(72) Inventor: Yusuke Yamaguchi, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 106 days.

(21) Appl. No.: 18/837,279

(22) PCT Filed: Jan. 17, 2023

(86) PCT No.: PCT/JP2023/001090
§ 371 (c)(1),
(2) Date: Aug. 9, 2024

(87) PCT Pub. No.: WO2023/162510
PCT Pub. Date: Aug. 31, 2023

(65) Prior Publication Data
US 2025/0035154 A1 Jan. 30, 2025

(30) Foreign Application Priority Data
Feb. 25, 2022 (JP) ................................. 2022-027590

(51) Int. Cl.
*F16C 29/06* (2006.01)
*F16J 15/3232* (2016.01)

(52) U.S. Cl.
CPC ......... *F16C 29/063* (2013.01); *F16J 15/3232* (2013.01)

(58) Field of Classification Search
CPC ................. F16J 15/3232; F16C 29/086; F16C 29/04–0673; F16C 29/063
See application file for complete search history.

(56) References Cited

U.S. PATENT DOCUMENTS 5,769,543 A * 6/1998 Tsukada ................ F16C 29/086
384/15
2008/0131037 A1* 6/2008 Keller ................. F16C 29/0645
384/15
2013/0243355 A1* 9/2013 Kawakami ............ F16C 29/086
277/572

FOREIGN PATENT DOCUMENTS

JP 2002089556 A * 3/2002 ............ F16C 29/086
JP 2006-170280 A 6/2006
(Continued)

OTHER PUBLICATIONS

Sep. 9, 2025 Office Action issued in Japanese Patent Application No. 2022-027590.
(Continued)

*Primary Examiner* — James Pilkington
*Assistant Examiner* — Aimee Tran Nguyen
(74) *Attorney, Agent, or Firm* — Oliff PLC

(57) ABSTRACT

A linear motion guide unit includes a rail having a first raceway surface, a slider relatively movably attached to the rail, and a plurality of rolling elements. The slider includes a carriage, an end cap, and an end seal. The end seal includes a first lip portion exposed outwardly on one side in the longitudinal direction and in contact with the rail, and a second lip portion disposed inwardly of the first lip portion and in contact with the rail. The second lip portion has a negative allowance of interference that is greater in a first region facing the first raceway surface than in a second region facing a surface other than the first raceway surface.

7 Claims, 6 Drawing Sheets

(56)     References Cited

FOREIGN PATENT DOCUMENTS

| | | |
|---|---|---|
| JP | 2008-002492 A | 1/2008 |
| JP | 2013-164118 A | 8/2013 |

OTHER PUBLICATIONS

Mar. 28, 2023 International Search Report issued in International Patent Application No. PCT/JP2023/001090.

* cited by examiner

LINEAR MOTION GUIDE UNIT

TECHNICAL FIELD

The present disclosure relates to a linear motion guide unit. The present application claims priority based on Japanese Patent Application No. 2022-27590 filed on Feb. 25, 2022, the entire contents of which are incorporated herein by reference.

BACKGROUND ART

A linear guide device including a guide rail, a slider, and rolling elements is known (see, for example, Patent Literature 1). The linear guide device disclosed in Patent Literature 1 includes a side seal that seals between the slider and the upper surface and both side surfaces of the guide rail.

CITATION LIST

Patent Literature

Patent Literature 1: Japanese Patent Application Laid-Open No. 2013-164118

SUMMARY OF INVENTION

Technical Problem

A higher seal is preferred between the rail and the slider. It is also desirable to ensure smooth sliding motion of the slider while maintaining high sealing performance. The linear guide device disclosed in Patent Literature 1 does not sufficiently meet these requirements.

In view of the foregoing, one of the objects is to provide a linear motion guide unit that can ensure smooth sliding motion of the slider while maintaining high sealing performance.

Solution to Problem

A linear motion guide unit according to the present disclosure includes: a rail having a first raceway surface extending in a longitudinal direction; a slider relatively movably attached to the rail and having a second raceway surface facing the first raceway surface; and a plurality of rolling elements rolling on a load-carrying race composed of the first raceway surface and the second raceway surface. The slider includes a carriage including the second raceway surface and having a first circulation passage provided in parallel with the load-carrying race, an end cap disposed on one side in the longitudinal direction of the carriage and having a second circulation passage provided to connect the load-carrying race with the first circulation passage, and an end seal having a shape following an outer shape of the carriage as viewed in the longitudinal direction and disposed on the one side in the longitudinal direction of the end cap to seal a gap between the slider and the rail. The carriage includes a pair of carriage wing portions disposed on both sides in a width direction of the rail, and a carriage base portion connected to each of the wing portions. The end seal includes a first lip portion exposed outwardly on the one side in the longitudinal direction and in contact with the rail, and a second lip portion disposed inwardly of the first lip portion and in contact with the rail. The second lip portion has a negative allowance of interference that is greater in a first region facing the first raceway surface than in a second region facing a surface other than the first raceway surface.

Advantageous Effects of Invention

The linear motion guide unit described above is capable of ensuring smooth sliding motion of the slider while maintaining high sealing performance.

DESCRIPTION OF EMBODIMENTS

Outline of Embodiments

Figure 1:
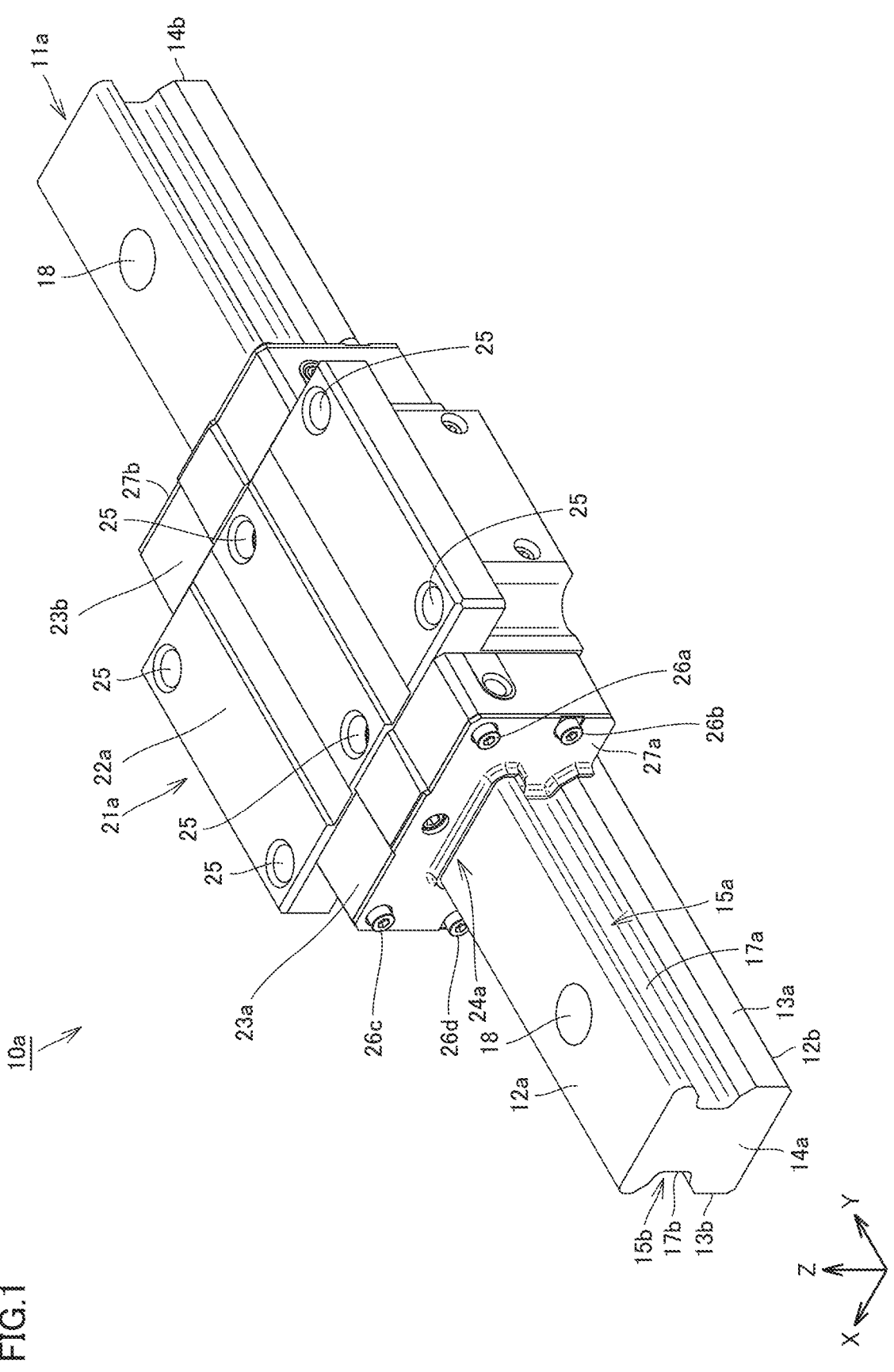
FIG. 1 is a schematic perspective view of a linear motion guide unit in Embodiment 1 of the present disclosure.

A linear motion guide unit of the present disclosure includes: a rail having a first raceway surface extending in a longitudinal direction; a slider relatively movably attached to the rail and having a second raceway surface facing the first raceway surface, the slider including a pair of wing portions disposed on both sides in a width direction of the rail and a base portion connected to each of the wing portions; and a plurality of rolling elements rolling on a load-carrying race composed of the first raceway surface and the second raceway surface. The slider includes a carriage including the second raceway surface and having a first circulation passage provided in parallel with the load-carrying race, an end cap disposed on one side in the longitudinal direction of the carriage and having a second circulation passage provided to connect the load-carrying race with the first circulation passage, and an end seal having a shape following an outer shape of the carriage as viewed in the longitudinal direction and disposed on the one side in the longitudinal direction of the end cap to seal a gap between the slider and the rail. The end seal includes a first lip portion exposed outwardly on the one side in the longitudinal direction and in contact with the rail, and a second lip portion disposed inwardly of the first lip portion and in contact with the rail. The second lip portion has a negative allowance of interference that is greater in a first region facing the first raceway surface than in a second region facing a surface other than the first raceway surface.

According to the linear motion guide unit of the present disclosure, the slider including a pair of wing portions and the base portion connected to the wing portions is attached such that the pair of wing portions straddle the rail. The end seal included in the slider is capable of sealing the upper surface and both side surfaces of the rail. The end seal includes the first lip portion and the second lip portion, which improves the sealing performance.

Here, the present inventors found that, in a linear motion guide unit including a slider and a rail having the configuration described above, the end seal having elasticity is pulled to the upper surface side of the rail by the rubber elastic force, which causes the end seal to be displaced, thereby deteriorating the sealing performance. The inventors have intensively studied a negative allowance of interference to be provided for the end seal, and have arrived at the idea of the present disclosure. According to the linear motion guide unit of the present disclosure, the negative allowance of interference in the first region is smaller than that in the second region, which can reduce the amount of displacement of the end seal. Therefore, such a linear motion guide unit is capable of ensuring smooth sliding motion of the slider while maintaining high sealing performance.

Another linear motion guide unit of the present disclosure includes: a rail having a first raceway surface extending in a longitudinal direction; a slider relatively movably attached to the rail and having a second raceway surface facing the first raceway surface, the slider including a pair of wing portions disposed on both sides in a width direction of the rail and a base portion connected to each of the wing portions; and a plurality of rolling elements rolling on a load-carrying race composed of the first raceway surface and the second raceway surface. The slider includes a carriage including the second raceway surface and having a first circulation passage provided in parallel with the load-carrying race, an end cap disposed on one side in the longitudinal direction of the carriage and having a second circulation passage provided to connect the load-carrying race with the first circulation passage, and an end seal having a shape following an outer shape of the carriage as viewed in the longitudinal direction and disposed on the one side in the longitudinal direction of the end cap to seal a gap between the slider and the rail. The end seal includes a first lip portion exposed outwardly on the one side in the longitudinal direction and in contact with the rail, and a second lip portion disposed inwardly of the first lip portion and in contact with the rail. The second lip portion has a negative allowance of interference provided only in a first region facing the first raceway surface.

According to such a linear motion guide unit, in the second lip portion, the negative allowance of interference is provided only in the first region facing the first raceway surface. This ensures smoother sliding motion of the slider while maintaining high sealing performance.

In the above linear motion guide unit, the end seal may be made of nitrile butadiene rubber (NBR), fluorocarbon rubber (Fluorine Kautschuk Material, FKM), or hydrogenated nitrile butadiene rubber (HNBR). Adopting nitrile butadiene rubber as the material for the end seal makes the compression set, tensile strength, and wear resistance, which are required for a sealing component, to be relatively good. Adopting fluorocarbon rubber as the material for the end seal ensures good oil resistance, chemical resistance, weather resistance, ozone resistance, and the like when, for example, the linear motion guide unit is used in special environments. Adopting hydrogenated nitrile butadiene rubber as the material for the end seal ensures better thermal resistance, oil resistance, and weather resistance compared to the case where nitrile butadiene rubber is adopted.

In the above linear motion guide unit, the negative allowance of interference in the first region may be equal to a negative allowance of interference provided in the first lip portion. This can improve the sealing performance.

SPECIFIC EMBODIMENTS

Specific embodiments of the linear motion guide unit of the present disclosure will be described below with reference to the drawings. In the drawings referenced below, the same or corresponding portions are denoted by the same reference numerals and the description thereof will not be repeated.

Embodiment 1

Figure 2:
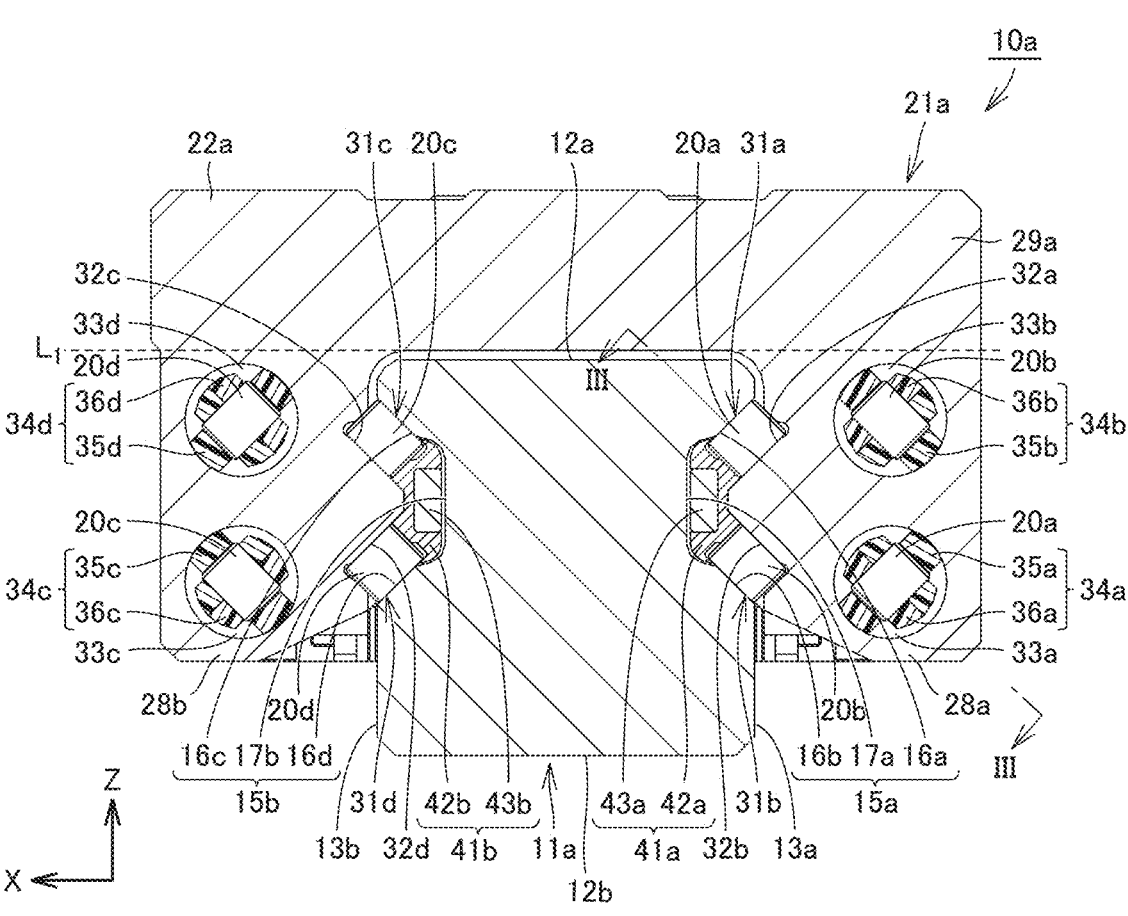
FIG. 2 is a schematic front view of the linear motion guide unit shown in FIG. 1, with the illustration of some members omitted.
Figure 3:
FIG. 3 is a schematic cross-sectional view when cut in the cross section indicated by arrows III-III in FIG. 2.
Figure 3:
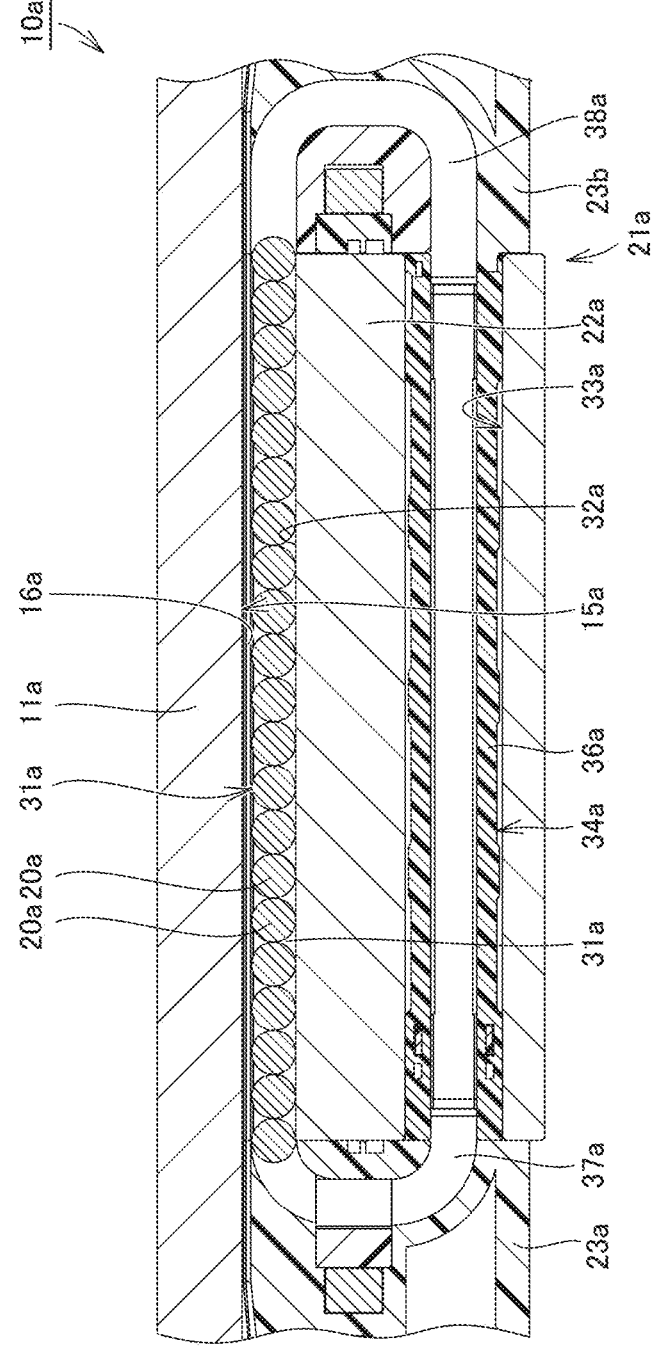

One embodiment of the present disclosure, Embodiment 1, will now be described. FIG. 1 is a schematic perspective view of a linear motion guide unit in Embodiment 1 of the present disclosure. FIG. 2 is a schematic front view of the linear motion guide unit shown in FIG. 1, with the illustration of some members omitted. FIG. 3 is a schematic cross-sectional view when cut in the cross section indicated by arrows III-III in FIG. 2. It should be noted that in FIG. 1 and the following figures, the X direction indicates a lateral direction, which is the width direction of the linear motion guide unit, the Y direction indicates the longitudinal direction of the linear motion guide unit, and the Z direction indicates the thickness direction (depth direction) of the linear motion guide unit. The X, Y, and Z directions are orthogonal to each other. FIG. 2 is a view in the direction indicated by the arrow Y. In FIGS. 2 and 3, the illustration of some of the rollers, described later, is omitted for ease of understanding.

Referring to FIGS. 1 to 3, the linear motion guide unit 10a according to Embodiment 1 of the present disclosure includes a rail 11a, which is a track rail, a slider 21a, and a plurality of rollers 20a, 20b, 20c, and 20d as rolling elements. The rail 11a is configured to extend straight in the longitudinal direction, the Y direction. Since the linear motion guide unit 10a of Embodiment 1 includes the rollers 20a, 20b, 20c, and 20d as the rolling elements, the load rating can be made large, while keeping the size compact, compared to the case where the rolling elements are, for example, balls. In the present embodiment, the linear motion guide unit 10a is a so-called four-row linear motion guide unit.

Firstly, the configuration of the rail 11a will be described. The rail 11a includes a rail upper end surface 12a and a rail lower end surface 12b spaced apart in the Z direction, a first rail side surface 13a and a second rail side surface 13b spaced apart in the X direction, and a rail front end surface 14a and a rail rear end surface 14b spaced apart in the Y direction. In other words, the rail 11a includes the first rail side surface 13a and the second rail side surface 13b extending in parallel along the longitudinal direction. The rail 11a has a pair of first raceway grooves 15a and 15b extending parallel to each other in the longitudinal direction. The first raceway groove 15a is provided on the first rail side surface 13a. The first raceway groove 15b is provided on the second rail side surface 13b. The linear motion guide unit 10a including the rail 11a with such a configuration can be more reliably reduced in size.

The first raceway groove 15a is composed of first raceway surfaces 16a, 16b, and a sidewall surface 17a. The first raceway surface 16a is inclined with respect to the X-Y plane and is provided on the rail upper end surface 12a side. The first raceway surface 16b is inclined with respect to the X-Y plane and is provided on the rail lower end surface 12b side. The sidewall surface 17*a* is continuous with each of the first raceway surface 16*a* and the first raceway surface 16*b*. The first raceway groove 15*b*, as with the first raceway groove 15*a*, is composed of first raceway surfaces 16*c*, 16*d*, and a sidewall surface 17*b*. The first raceway surface 16*c* is inclined with respect to the X-Y plane and is provided on the rail upper end surface 12*a* side. The first raceway surface 16*d* is inclined with respect to the X-Y plane and is provided on the rail lower end surface 12*b* side. The sidewall surface 17*b* is continuous with each of the first raceway surface 16*c* and the first raceway surface 16*d*. In other words, the rail 11*a* includes the first raceway surfaces 16*a*, 16*b*, 16*c*, and 16*d* extending in the longitudinal direction. The linear motion guide unit 10*a* including such a rail 11*a* is suitable for use in machine tools, assembly devices, conveying machines, and the like.

The rail 11*a* has a plurality of through holes 18 penetrating in the Z direction from the rail upper end surface 12*a* to the rail lower end surface 12*b*. The plurality of through holes 18 are provided spaced apart in the Y direction. The through holes 18 are effectively utilized, for example, for mounting the rail 11*a* in a predetermined position at the time of use of the linear motion guide unit 10*a*.

The configuration of the slider 21*a* will now be described. The slider 21*a* is relatively movably attached to the rail 11*a*. The slider 21*a* includes a pair of wing portions 28*a* and 28*b* disposed on both sides in the width direction of the rail 11*a*, and a base portion 29*a* connected to each of the wing portions 28*a* and 28*b*. The pair of wing portions 28*a* and 28*b* are arranged spaced apart in the X direction. The base portion 29*a* includes a region that is opposed to the rail upper end surface 12*a* when the slider 21*a* is attached to the rail 11*a*. A boundary $L_1$ between the pair of wing portions 28*a*, 28*b* and the base portion 29*a* is indicated by a long dashed dotted line extending in the X direction in FIG. 2. The slider 21*a* has a concave portion 24*a* which is concaved in the Z direction. The slider 21*a* is attached such that the rail 11*a* is fitted in this concave portion 24*a*. In other words, the slider 21*a* is slidably straddled on the rail 11*a*. In the present embodiment, the slider 21*a* is attached so as to straddle the rail 11*a* and is movable in the Y direction.

The slider 21*a* includes a carriage 22*a*, a pair of end caps 23*a* and 23*b*, which are specifically a first end cap 23*a* and a second end cap 23*b*, a pair of end seals 27*a* and 27*b*, which are specifically a first end seal 27*a* and a second end seal 27*b*, and retaining members 41*a* and 41*b* for retaining the rollers 20*a*, 20*b*, 20*c*, and 20*d* in the carriage 22*a*. The first end cap 23*a* is disposed on one side in the longitudinal direction of the carriage 22*a*, specifically on the rail front end surface 14*a* side of the carriage 22*a* in the longitudinal direction. The second end cap 23*b* is disposed on the other side in the longitudinal direction of the carriage 22*a*, specifically on the rail rear end surface 14*b* side of the carriage 22*a* in the longitudinal direction. In other words, the slider 21*a* includes the pair of end caps 23*a* and 23*b* disposed on the respective sides in the longitudinal direction of the carriage 22*a*. The first end cap 23*a* has through holes penetrating in the Y direction. The first end cap 23*a* and the second end cap 23*b* each have a so-called plate shape, with its thickness direction corresponding to the longitudinal direction. The first end cap 23*a* is connected to the carriage 22*a* with a plurality of bolts 26*a*, 26*b*, 26*c*, and 26*d* utilizing the through holes. The second end cap 23*b* is connected to the carriage 22*a* with a plurality of bolts utilizing through holes.

The retaining member 41*a* includes a retaining plate 42*a* and a retaining band 43*a*. The retaining plate 42*a* includes second guide surfaces that are in contact with second end surfaces located on one side of the rollers 20*a* and 20*b* to guide the rollers 20*a* and 20*b*. The retaining plate 42*a* includes a groove portion that is concaved so as to receive the retaining band 43*a*. The retaining member 41*b*, as with the retaining member 41*a*, includes a retaining plate 42*b* and a retaining band 43*b*. The configuration of the retaining plate 42*b* is the same as that of the retaining plate 42*a*. That is, the retaining plate 42*b* includes second guide surfaces that are in contact with second end surfaces located on one side of the rollers 20*c* and 20*d* to guide the rollers 20*c* and 20*d*. The retaining plate 42*b* includes a groove portion that is concaved so as to receive the retaining band 43*b*.

The end seal 27*a* is disposed on the one side in the longitudinal direction of the first end cap 23*a*. The end seal 27*b* is disposed on the other side in the longitudinal direction of the second end cap 23*b*. The slider 21*a* further includes lubricating members for applying lubricant. The end seal 27*a* and a lubricating member, together with the first end cap 23*a*, are attached to the carriage 22*a* with the bolts 26*a*, 26*b*, 26*c*, and 26*d*. As in the case of the end seal 27*a*, the end seal 27*b* and a lubricating member, together with the second end cap 23*b*, are attached to the carriage 22*a* with the bolts. The configuration of the end seal 27*a* will be described in detail later. It should be noted that the carriage 22*a* has a plurality of through holes 25 penetrating in the Z direction and having grooves formed on the inner circumferential surfaces thereof. In the present embodiment, six such through holes 25 are provided. The six through holes 25 are provided spaced apart from each other in the X and Y directions, and are utilized, for example, when connecting the slider 21*a* to another member.

The carriage 22*a* includes second raceway surfaces 32*a*, 32*b*, 32*c*, and 32*d* facing the first raceway surfaces 16*a*, 16*b*, 16*c*, and 16*d*, respectively. The first raceway surface 16*a* and the second raceway surface 32*a* form a load-carrying race 31*a* on which the rollers 20*a* roll. The first raceway surface 16*b* and the second raceway surface 32*b* form a load-carrying race 31*b* on which the rollers 20*b* roll. The first raceway surface 16*c* and the second raceway surface 32*d* form a load-carrying race 31*c* on which the rollers 20*c* roll. The first raceway surface 16*d* and the second raceway surface 32*d* form a load-carrying race 31*d* on which the rollers 20*d* roll.

The carriage 22*a* has first circulation passages 33*a*, 33*b*, 33*c*, and 33*d* provided in parallel with the load-carrying races 31*a*, 31*b*, 31*c*, and 31*d*, respectively. The first circulation passages 33*a*, 33*b*, 33*c*, and 33*d* are also called return passages. In the first circulation passage 33*a*, a hollow cylindrical sleeve 34*a* formed by combining a first split member 35*a* and a second split member 36*a* is disposed. The rollers 20*a* move in the sleeve 34*a*. Similarly, a hollow cylindrical sleeve 34*b* formed by combining a first split member 35*b* and a second split member 36*b* is disposed in the first circulation passage 33*b*. A hollow cylindrical sleeve 34*c* formed by combining a first split member 35*c* and a second split member 36*c* is disposed in the first circulation passage 33*c*. A hollow cylindrical sleeve 34*d* formed by combining a first split member 35*d* and a second split member 36*d* is disposed in the first circulation passage 33*d*. The carriage 22*a* includes first guide surfaces that are in contact with first end surfaces located on the other side of the rollers 20*a*, 20*b*, 20*c*, and 20*d* to guide the rollers 20*a*, 20*b*, 20*c*, and 20*d*.

The first end cap 23*a* has a second circulation passage 37*a* provided therein (see in particular FIG. 3). The second end cap 23*b* has a second circulation passage 38*a* provided therein. The second circulation passages 37a and 38a are also called turnaround passages. The second circulation passages 37a and 38a each connect the load-carrying race 31a with the first circulation passage 33a. The rollers 20a circulate through a looped path that is composed of the load-carrying race 31a, the second circulation passage 37a, the first circulation passage 33a, and the second circulation passage 38a. It should be noted that the rollers 20b circulate through a looped path composed of the load-carrying race 31b, a second circulation passage in the first end cap 23a, the first circulation passage 33b, and a second circulation passage in the second end cap 23b. The rollers 20c circulate through a looped path composed of the load-carrying race 31c, a second circulation passage in the first end cap 23a, the first circulation passage 33c, and a second circulation passage in the second end cap 23b. The rollers 20d circulate through a looped path composed of the load-carrying race 31d, a second circulation passage in the first end cap 23a, the first circulation passage 33d, and a second circulation passage in the second end cap 23b.

Figure 4:
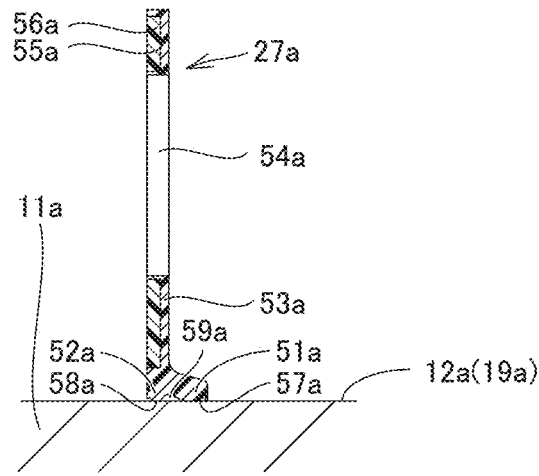
FIG. 4 is a schematic cross-sectional view of an end seal when the end seal is cut in a plane parallel to the Y-Z plane at the center in the X direction.

Here, the configuration of the end seal 27a (first end seal) will be described in detail. FIG. 4 is a schematic cross-sectional view of the end seal 27a when the end seal 27a is cut in a plane parallel to the Y-Z plane at the center in the X direction. The end seal 27b (second end seal) has the same configuration as the end seal 27a, so the description thereof will not be repeated.

The end seal 27a is made of rubber. The material of the end seal 27a is nitrile butadiene rubber (NBR), fluorocarbon rubber (Fluorine Kautschuk Material, FKM), or hydrogenated nitrile butadiene rubber (HNBR). Adopting nitrile butadiene rubber as the material for the end seal 27a makes the compression set, tensile strength, and wear resistance, which are required for a sealing component, to be relatively good. Adopting fluorocarbon rubber as the material for the end seal 27a ensures good oil resistance, chemical resistance, weather resistance, ozone resistance, and the like when, for example, the linear motion guide unit 10a is used in special environments. Adopting hydrogenated nitrile butadiene rubber as the material for the end seal 27a ensures better thermal resistance, oil resistance, and weather resistance compared to the case where nitrile butadiene rubber is adopted. In the present embodiment, the end seal 27a is made of nitrile butadiene rubber.

The end seal 27a includes a first lip portion 51a, a second lip portion 52a, and a plate-shaped portion 53a. The plate-shaped portion 53a has a flat plate shape with its thickness direction corresponding to the Y direction, and is arranged parallel to the X-Z plane. The plate-shaped portion 53a has a through hole 54a penetrating in the thickness direction. The plate-shaped portion 53a also has a recess 55a which is concaved in the thickness direction, and a lubricating member 56a is disposed in the recess 55a.

The first lip portion 51a is configured to protrude on one side in the thickness direction of the plate-shaped portion 53a, and also to protrude on the rail 11a side. At the time of mounting the end seal 27a, the first lip portion 51a is elastically deformed to come into contact with the rail upper end surface 12a, a portion of the first rail side surface 13a, and a portion of the second rail side surface 13b at a nip portion 57a. The first lip portion 51a is also exposed to the outside at the time of mounting the end seal 27a.

The second lip portion 52a is configured to protrude on the other side in the thickness direction of the plate-shaped portion 53a, and also to protrude on the rail 11a side. The second lip portion 52a is formed spaced apart from the first lip portion 51a in the Y direction. At the time of mounting the end seal 27a, the second lip portion 52a is elastically deformed to come into contact with the rail upper end surface 12a, a portion of the first rail side surface 13a, and a portion of the second rail side surface 13b at a nip portion 58a. At the time of mounting the end seal 27a, the second lip portion 52a is configured so as not to be exposed outwardly and to be invisible from the outside. At the time of mounting the end seal 27a, a space 59a is formed between the first lip portion 51a and the second lip portion 52a in the Y direction. The end seal 27a with such a configuration adopts a so-called double lip structure, which improves the sealing performance.

Figure 5:
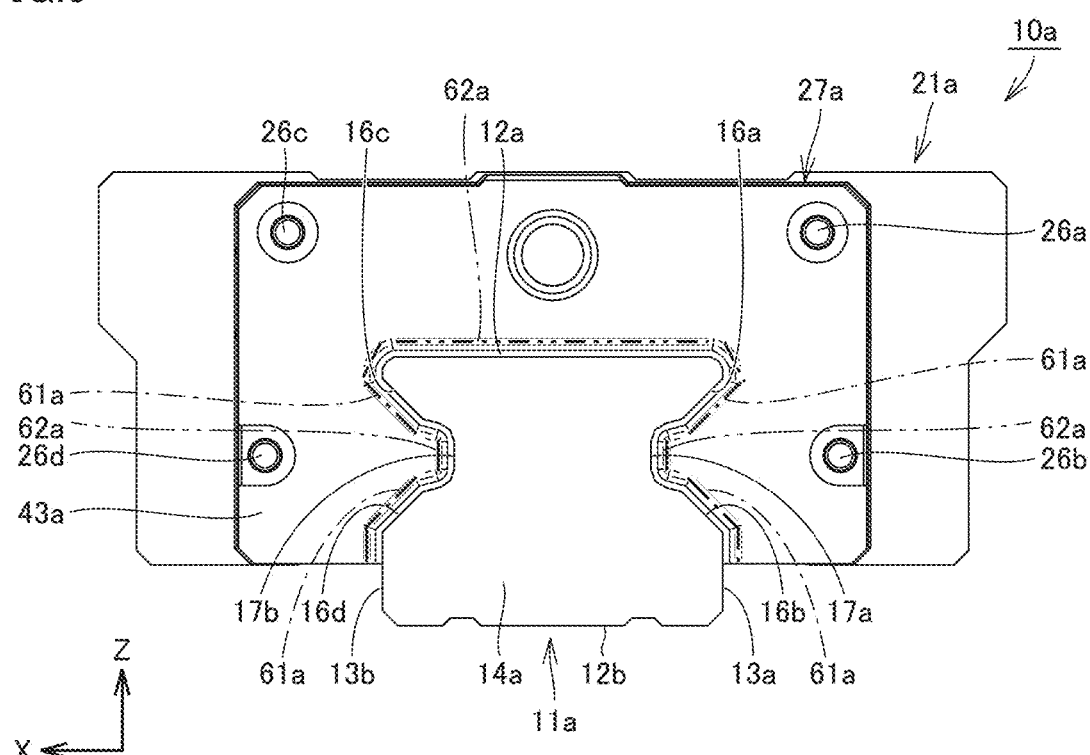
FIG. 5 is a schematic front view of the end seal as viewed in the longitudinal direction.

Here, in the second lip portion 52a, a negative allowance of interference provided in first regions 61a facing the first raceway surfaces 16a, 16b, 16c, and 16d is greater than a negative allowance of interference provided in second regions 62a facing surfaces other than the first raceway surfaces 16a, 16b, 16c, and 16d. FIG. 5 is a schematic front view of the end seal 27a as viewed in the longitudinal direction. Referring to FIG. 5, the regions where the first regions 61a are located are indicated by long dashed dotted lines, and the regions where the second regions 62a are located are indicated by long dashed double-dotted lines. Specifically, the surfaces other than the first raceway surfaces 16a, 16b, 16c, and 16d include the sidewall surfaces 17a and 17b of the rail 11a and the rail upper end surface 12a. The surfaces other than the first raceway surfaces 16a, 16b, 16c, and 16d further include surfaces between the rail upper end surface 12a and the first raceway surfaces 16a, 16c, surfaces between the first raceway surfaces 16a, 16c and the sidewall surfaces 17a, 17b, surfaces between the sidewall surfaces 17a, 17b and the first raceway surfaces 16b, 16d, a surface between the first raceway surface 16b, 16d and a lower end surface of the slider 21a on the first rail side surface 13a, and a surface between the first raceway surface 16b, 16d and a lower end surface of the slider 21a on the second rail side surface 13b. In the present embodiment, the negative allowance of interference in the first region 61a is equal to a negative allowance of interference provided in the first lip portion 51a.

Figure 6:
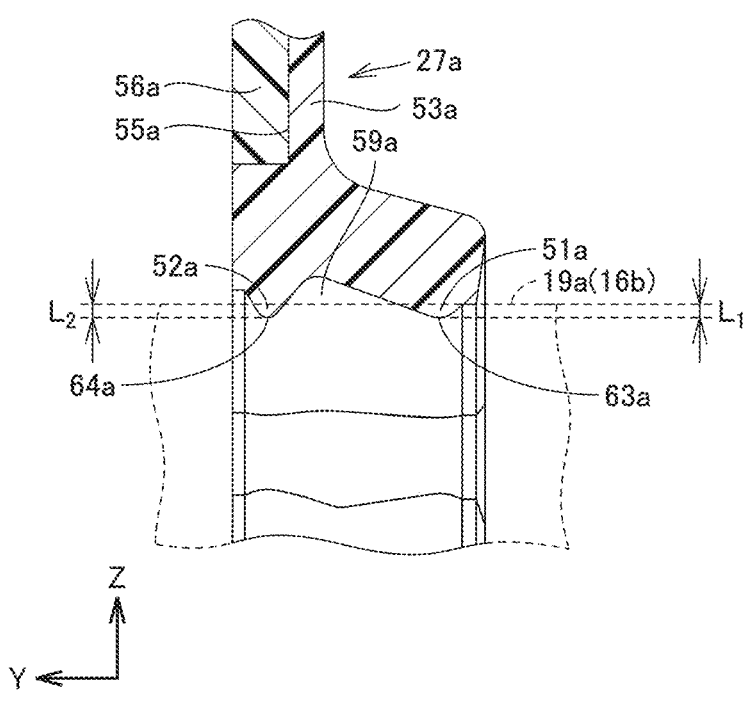
FIG. 6 is an enlarged cross-sectional view of a portion of the end seal at a position where a first region is located.

FIG. 6 is an enlarged cross-sectional view of a portion of the end seal 27a at a position where the first region 61a is located. For ease of understanding, the rail 11a is indicated by dashed lines in FIG. 6 and in FIGS. 7 and 8 referenced below. Referring to FIG. 6, in the state where the end seal 27a is not mounted, the negative allowance of interference in the first lip portion 51a, i.e., a length from a surface 19a of the rail 11a to a tip end 63a of the first lip portion 51a in the state where the end seal 27a is mounted, is indicated by a length $L_1$. This surface 19a of the rail 11a corresponds, for example, to the first raceway surface 16b. The negative allowance of interference in the second lip portion 52a, i.e., a length from the surface 19a of the rail 11a to a tip end 64a of the second lip portion 52a, is indicated by a length $L_2$. In the present embodiment, the length $L_1$=the length $L_2$.

Figure 7:
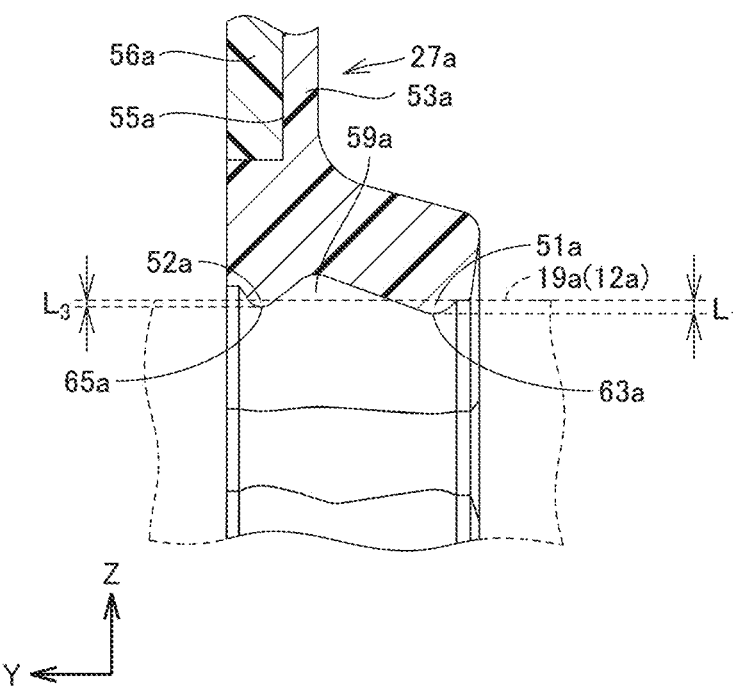
FIG. 7 is an enlarged cross-sectional view of a portion of the end seal at a position where a second region is located.

FIG. 7 is an enlarged cross-sectional view of a portion of the end seal 27a at a position where the second region 62a is located. Referring to FIG. 7, in the state where the end seal 27a is not mounted, the negative allowance of interference in the second lip portion 52a, i.e., a length from the surface 19a of the rail 11a to a tip end 65a of the second lip portion 52a in the state where the end seal 27a is mounted, is indicated by a length $L_3$. This surface 19a of the rail 11a corresponds, for example, to the rail upper end surface 12a. The negative allowance of interference in the first lip portion 51a, i.e., the length from the surface 19a of the rail 11a to the tip end 65a of the first lip portion 51a, is indicated by the length $L_1$. In the present embodiment, the length $L_1$>the length $L_3$.

According to the linear motion guide unit 10a described above, the negative allowance of interference in the first region 61a is smaller than that in the second region 62a, which can reduce the amount of displacement of the end seal 27a. Accordingly, such a linear motion guide unit 10a can ensure smooth sliding motion of the slider 21a while maintaining high sealing performance.

It should be noted that the result of a simulation using the finite element method showed that the amount of displacement of the end seal 27a in the linear motion guide unit 10a of the present disclosure was not more than one-fourth compared to the case where the negative allowance of interference was provided for the entire area in contact with the rail 11a.

In the present embodiment, the negative allowance of interference in the first region 61a is equal to the negative allowance of interference provided in the first lip portion 51a. The sealing performance can thus be improved.

Embodiment 2

Figure 8:
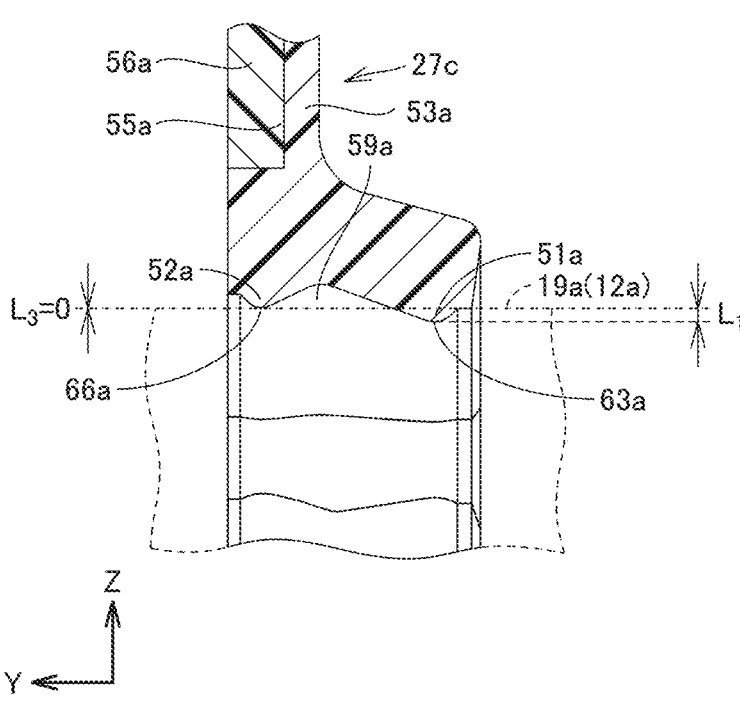
FIG. 8 is a schematic cross-sectional view of a portion of a linear motion guide unit in Embodiment 2 of the present disclosure.

Another embodiment, Embodiment 2, will now be described. FIG. 8 is a schematic cross-sectional view of a portion of a linear motion guide unit in Embodiment 2 of the present disclosure. Referring to FIG. 8, an end seal 27c included in the linear motion guide unit in Embodiment 2 includes a first lip portion 51a exposed outwardly on one side in the longitudinal direction and in contact with the rail 11a, and a second lip portion 52a disposed inwardly of the first lip portion 51a and in contact with the rail 11a. In the present embodiment, in the second lip portion 52a, a negative allowance of interference is provided only in first regions 61a facing the first raceway surfaces 16a, 16b, 16c, and 16d. In other words, no negative allowance of interference is provided in second regions 62a facing surfaces other than the first raceway surfaces 16a, 16b, 16c, and 16d. More specifically, a length $L_3$ from the surface 19a of the rail 11a to a tip end 66a of the second lip portion 52a in the state where the end seal 27c is mounted is equal to 0.

Other Embodiment

While the rolling elements are rollers in the above embodiments, the rolling elements are not limited thereto and may be balls.

It should be understood that the embodiments disclosed herein are illustrative and non-restrictive in every respect. The scope of the present invention is defined by the terms of the claims, and is intended to include any modifications within the scope and meaning equivalent to the terms of the claims.

REFERENCE SIGNS LIST

10a: linear motion guide unit; 11a: rail; 12a: rail upper end surface; 12b: rail lower end surface; 13a: first rail side surface; 13b: second rail side surface; 14a: rail front end surface; 14b: rail rear end surface; 15a, 15b: first raceway groove; 16a, 16b, 16c, 16d: first raceway surface; 17a, 17b: sidewall surface; 18, 25, 54a: through hole; 19a: surface; 20a, 20b, 20c, 20d: roller; 21a: slider; 22a: carriage; 23a: end cap (first end cap); 23b: end cap (second end cap); 24a: concave portion; 26a, 26b, 26c, 26d: bolt; 27a: end seal (first end seal); 27b: end seal (second end seal); 28a, 28b: wing portion; 29a: base portion; 31a, 31b, 31c, 31d: load-carrying race; 32a, 32b, 32c, 32d: load-carrying race; 33a, 33b, 33c, 33d: first circulation passage; 34a, 34b, 34c, 34d: sleeve; 35a, 35b, 35c, 35d: first split member; 36a, 36b, 36c, 36d: second split member; 37a, 38a: second circulation passage; 41a, 41b: retaining member; 42a, 42b: retaining plate; 43a, 43b: retaining band; 51a: first lip portion; 52a: second lip portion; 53a: plate-shaped portion; 55a: recess; 56a: lubricating member; 57a, 58a: nip portion; 59a: space; 61a: first region; 62a: second region; and 63a, 64a, 65a, 66a: tip end.

The invention claimed is:

1. A linear motion guide unit comprising:

a rail having a first raceway surface extending in a longitudinal direction;

a slider relatively movably attached to the rail and having a second raceway surface facing the first raceway surface, the slider including a pair of wing portions disposed on both sides in a width direction of the rail and a base portion connected to each of the wing portions; and a plurality of rolling elements rolling on a load-carrying race composed of the first raceway surface and the second raceway surface;

the slider including a carriage including the second raceway surface and having a first circulation passage provided in parallel with the load-carrying race, an end cap disposed on one side in the longitudinal direction of the carriage and having a second circulation passage provided to connect the load-carrying race with the first circulation passage, and an end seal having a shape following an outer shape of the carriage as viewed in the longitudinal direction and disposed on the one side in the longitudinal direction of the end cap to seal a gap between the slider and the rail, the end seal including a first lip portion exposed outwardly on the one side in the longitudinal direction and in contact with the rail, and a second lip portion disposed inwardly of the first lip portion in the longitudinal direction and in contact with the rail, the second lip portion having a negative allowance of interference that is greater in a first region facing the first raceway surface than in a second region facing a surface other than the first raceway surface.

2. The linear motion guide unit according to claim 1, wherein the end seal is made of nitrile butadiene rubber, fluorocarbon rubber, or hydrogenated nitrile butadiene rubber.

3. The linear motion guide unit according to claim 2, wherein the negative allowance of interference in the first region is equal to a negative allowance of interference provided in the first lip portion.

4. The linear motion guide unit according to claim 1, wherein the negative allowance of interference in the first region is equal to a negative allowance of interference provided in the first lip portion.

5. A linear motion guide unit comprising:

a rail having a first raceway surface extending in a longitudinal direction;

a slider relatively movably attached to the rail and having a second raceway surface facing the first raceway surface, the slider including a pair of wing portions disposed on both sides in a width direction of the rail and a base portion connected to each of the wing portions; and a plurality of rolling elements rolling on a load-carrying race composed of the first raceway surface and the second raceway surface;

the slider including a carriage including the second raceway surface and having a first circulation passage provided in parallel with the load-carrying race, an end cap disposed on one side in the longitudinal direction of the carriage and having a second circulation passage provided to connect the load-carrying race with the first circulation passage, and an end seal having a shape following an outer shape of the carriage as viewed in the longitudinal direction and disposed on the one side in the longitudinal direction of the end cap to seal a gap between the slider and the rail, the end seal including a first lip portion exposed outwardly on the one side in the longitudinal direction and in contact with the rail, and a second lip portion disposed inwardly of the first lip portion and in contact with the rail, the second lip portion having a negative allowance of interference provided only in a first region facing the first raceway surface.

6. The linear motion guide unit according to claim 5, wherein the end seal is made of nitrile butadiene rubber, fluorocarbon rubber, or hydrogenated nitrile butadiene rubber.

7. The linear motion guide unit according to claim 5, wherein the negative allowance of interference in the first region is equal to a negative allowance of interference provided in the first lip portion.

* * * * *